US012695017B2

(12) United States Patent
Vornkahl

(10) Patent No.: US 12,695,017 B2
(45) Date of Patent: Jul. 28, 2026

(54) CHOKE FOR A MULTI-CONDUCTOR SYSTEM

(71) Applicant: TDK Electronics AG, Munich (DE)

(72) Inventor: Michael Vornkahl, Gerstetten (DE)

(73) Assignee: TDK Electronics AG, Munich (DE)

( * ) Notice: Subject to any disclaimer, the term of this patent is extended or adjusted under 35 U.S.C. 154(b) by 1159 days.

(21) Appl. No.: 17/647,777

(22) Filed: Jan. 12, 2022

(65) Prior Publication Data

US 2022/0223328 A1 Jul. 14, 2022

(30) Foreign Application Priority Data

Jan. 12, 2021 (DE) ........................ 102021100394.6

(51) Int. Cl.
*H01F 17/06* (2006.01)
*H01F 3/14* (2006.01)
*H01F 17/00* (2006.01)

(52) U.S. Cl.
CPC ............ *H01F 17/062* (2013.01); *H01F 3/14* (2013.01); *H01F 2017/0093* (2013.01)

(58) Field of Classification Search
CPC ... H01F 17/062; H01F 3/14; H01F 2017/0093
USPC .......................................................... 336/229
See application file for complete search history.

(56) References Cited

U.S. PATENT DOCUMENTS 3,387,203 A 6/1968 Munnelly
4,833,436 A * 5/1989 Martin .................... H01F 30/16 336/185
5,165,162 A * 11/1992 Charles ............... H01F 41/0206 29/605
5,488,344 A * 1/1996 Bisbee .................. H01F 27/323 336/208

(Continued)

FOREIGN PATENT DOCUMENTS

CN 107293389 B * 6/2019 ............. H01F 17/00
DE 102017214220 A1 2/2019

(Continued)

*Primary Examiner* — Shawki S Ismail
*Assistant Examiner* — Joselito S. Baisa
(74) *Attorney, Agent, or Firm* — Slater Matsil, LLP

(57) ABSTRACT

In an embodiment a choke includes a core assembly and a winding block having a predetermined number of turns for each conductor of a multi-conductor system, wherein the core assembly comprises at least one stacking unit comprising a closed ring and a separation unit, wherein the separation unit comprises a separation segment for each conductor, the separation segments being arranged on a first surface of the ring in a pre-determined spaced-apart relationship along a circumferential line of the ring such that a gap is present between each of the adjacent separation segments, wherein each separation segment comprises a ferromagnetic material and/or the closed ring is formed as a closed magnetic toroidal core, wherein the core assembly has an inner opening enclosed by the ring and at least partially by the separation unit, and wherein the winding blocks are (Continued)

arranged in correspondence with the separation segments so that windings of respective winding blocks extend through the inner opening of the core assembly and enclose the ring and the corresponding separation segment.

22 Claims, 10 Drawing Sheets

(56) References Cited

U.S. PATENT DOCUMENTS

| | | | | |
|---|---|---|---|---|
| 7,990,244 | B2 * | 8/2011 | Huss | H01F 27/2895 336/198 |
| 8,567,046 | B2 * | 10/2013 | Prabhakaran | H01F 27/2804 156/247 |
| 8,922,311 | B2 | 12/2014 | Pal et al. | |
| 9,496,085 | B2 * | 11/2016 | Pal | H01F 17/062 |
| 11,508,510 | B2 * | 11/2022 | Xu | H01F 3/14 |
| 2009/0261939 | A1 * | 10/2009 | Shudarek | H01F 27/263 336/212 |
| 2015/0349628 | A1 | 12/2015 | Cheng | |
| 2018/0301276 | A1 * | 10/2018 | Yeh | H01F 27/292 |
| 2019/0066903 | A1 * | 2/2019 | Daily | H01F 30/16 |
| 2020/0251264 | A1 | 8/2020 | Kapoor et al. | |
| 2020/0265980 | A1 | 8/2020 | Kapoor et al. | |

FOREIGN PATENT DOCUMENTS

| | | | | | |
|---|---|---|---|---|---|
| DE | 102018117211 | A1 | | 1/2020 | |
| EP | 2061045 | A2 | * | 5/2009 | H01F 41/122 |
| EP | 2711941 | A1 | | 3/2014 | |
| JP | 2000208343 | A | * | 7/2000 | |
| WO | WO9119305 | A1 | * | 12/1991 | |
| WO | 2019034501 | A1 | | 2/2019 | |

* cited by examiner

Prior Art

CHOKE FOR A MULTI-CONDUCTOR SYSTEM

CROSS-REFERENCE TO RELATED APPLICATIONS

This application claims the benefit of German Application No. 102021100394.6, filed on Jan. 12, 2021, which application is hereby incorporated herein by reference.

TECHNICAL FIELD

The invention relates to a choke for a multi-conductor system.

BACKGROUND

Current compensated chokes are usually connected between a power grid and an electrical device supplied with current by the power grid. Current-compensated chokes of the type mentioned are preferably used for attenuating asymmetrical interference currents fed into the power supply grid, for example, by a frequency converter. In general, every device connected to a power supply grid has repercussions on the power supply grid. In the case of high-frequency repercussion, this is referred to as radio interference.

Current-compensated chokes provide high inductance values for common-mode circuits. They are therefore also referred to as common-mode chokes. However, to establish electromagnetic compatibility (EMC) of an electrical device, inductance is required in most cases even for symmetric currents. Since symmetrical load currents are not compensated in the above-mentioned current-compensated chokes, only small inductance values for symmetrical load currents can be realized with current-compensated chokes. A stray inductance of the common-mode chokes is often used as a differential inductance. If the stray inductance of the common-mode choke is not sufficient, a further electrical component has to be used for each phase or conductor. The further electrical component is usually a differential-mode choke. The differential-mode choke is also known as a symmetrical choke or storage choke.

FIG. 9 shows a combined common-mode-differential-mode choke according to the state of the art, which combines the functionalities of a common-mode choke and a differential-mode choke in one component. The combined choke comprises, for example, a toroidal core assembly with a toroidal core 90 and a bar arrangement 91. In the example shown, the toroidal core 90 is provided on two opposite sides with one winding 92, 93 each for the forward line and for the return line with the same number of turns. The bar arrangement 91 serves to increase the stray inductance of the toroidal core 90 by a pre-definable proportion. The stray inductance is thus higher than that of the same toroidal core without a bar arrangement. The bar comprises, for example, a ferrite rod. The ferrite rod is attached to the core 90 for this purpose after the windings 92, 93 have been applied, for example by means of bonding.

However, such chokes are costly to manufacture and have poorer saturation properties or reduced linearity compared with a common-mode choke without a bar arrangement.

SUMMARY

Embodiments provide a choke for a multi-conductor system which can be manufactured inexpensively, is suitable for filtering out common-mode interference and at the same time enables sufficient suppression of differential-mode interference, in particular in applications with currents above 10 A. Further embodiments provide a choke for a multi-conductor system which enables sufficient suppression of differential-mode interference, in particular in applications with currents above 10 A.

According to a first aspect, embodiments are characterized by a choke for a multi-conductor system comprising a core assembly and, for each conductor of the multi-conductor system, a winding block with a pre-determined number of turns. The core assembly comprises at least one stacking unit comprising a closed magnetic ring and a separation unit. The separation unit is disposed on a first surface of the ring and comprises a closed non-magnetic separation ring or a separation ring having a magnetic permeability which is smaller, in particular considerably smaller, than the magnetic permeability of the closed magnetic ring. As an example, the magnetic permeability of the separation ring is at most 1/10 of the magnetic permeability of the closed magnetic ring. The core assembly has an inner opening enclosed by the ring of the at least one stacking unit and by the separation unit of the at least one stacking unit. The windings of the respective winding blocks extend through the inner opening of the core assembly and enclose the ring and the separation unit of the at least one stacking unit. The closed ring is formed as a closed magnetic toroidal core.

As an example, the separation ring is formed as a plastic part. The plastic part can be hard, i.e., non-elastic so that the height of the separation ring and a distance between closed magnetic rings separated by the separation rings, if applicable, are well-defined. As an example, the plastic part may be an injection-molded plastic part.

Advantageously, the separation unit with the respective winding blocks each forms an air coil ($\mu r=1$) or a coil having a core with low permeability which acts as a differential-mode inductance. The differential-mode inductances of the choke thus each comprise a stray inductance and the inductances of the respective air coils.

According to a second aspect, embodiments are characterized by a choke for a multi-conductor system comprising a core assembly and, for each conductor of the multi-conductor system, a winding block with a predetermined number of turns. The core assembly comprises at least one stacking unit comprising a closed ring and a separation unit. The separation unit comprises a separation segment for each conductor. The separation segments are arranged on the first surface of the ring in a pre-determined spaced-apart relationship along the circumference of the ring such that there is a gap between each of the adjacent separation segments. The core assembly includes an inner opening enclosed by the ring of the at least one stacking unit and at least partially enclosed by the separation unit of the at least one stacking unit. The winding blocks are arranged in correspondence with the separation segment, such that the windings of the respective winding blocks extend through the inner opening of the core assembly and enclose the ring and the corresponding separation segment. The separation segments comprise a magnetic material or consist of a magnetic material and/or the closed ring is formed as a closed magnetic toroid.

If the ring or rings of the choke according to the second aspect are configured magnetically, the choke acts as a combined current-compensated differential-mode and common-mode choke whose differential-mode inductance is highly saturation resistant, i.e., exhibits high linearity. The ring or rings of the choke can also be slightly magnetic. "Slightly magnetic" can, in particular, mean here and in the following that the magnetic permeability is between 1 and 20 and/or that the magnetic permeability is considerably smaller than the magnetic permeability of other components of the choke. As an example, the magnetic permeability of the ring or rings is considerably smaller than the magnetic permeability of the separation segments. As an example, the magnetic permeability of the ring or the rings is at most 1/10 of the magnetic permeability of the separation segments.

If the ring or rings of the choke in accordance with the second aspect are non-magnetic, the choke acts as a differential-mode choke whose differential-mode inductance is very saturation resistant, i.e. has a high linearity.

The separation segments separated by the gaps generate the required differential-mode inductances. The separation segments are, for example, bonded to the ring, taped and/or held via joining parts. The gaps between the separation segments allow a differential-mode inductance to be very saturation resistant, that is, to have high linearity, and the combined differential-mode and common-mode choke for a multi-conductor system can be designed for high currents and still have a very compact design.

The first surface of the ring of the choke according to the first and second aspects is preferably arranged perpendicular to a longitudinal axis of the choke. The magnetic rings of the chokes according to the first aspect and the second aspect generate the required common-mode inductance.

The core assembly of the choke according to the first and the second aspect enables a very compact construction. The core assembly can be easily wound using known winding techniques. One winding block per conductor or phase is simultaneously a winding for the common-mode component and the differential-mode component. This reduces the amount of material required for a winding component and the series resistance of the winding blocks. Advantageously, a combined differential- and common-mode choke for a multi-conductor system can thus be provided in a very compact design.

In an advantageous embodiment according to the first and second aspects, the winding blocks each comprise an equal number of turns and/or an equal winding direction. This has the advantage that good current compensation for common-mode disturbances can be achieved.

In a further advantageous embodiment according to the first and second aspects, the winding blocks are arranged along a circumferential line of the ring such that respective distances between immediately adjacent winding blocks are equal or at least approximately equal, i.e. within usual manufacturing tolerances. The symmetrical arrangement of the winding blocks makes it possible to achieve good current compensation for common-mode interference. In particular, in a circular ring, the winding blocks are arranged at a distance of 360°/M, where M is the number of conductors of the multi-conductor system. For example, in a 3-wire system, the winding blocks are arranged at angles of 0°, 120° and 240°, respectively, and in a 4-wire system at angles of 0°, 90°, 180° and 270°.

In a further advantageous embodiment according to the second aspect, respective distances between adjacent separation segments are equal. In particular, the separation segments of the at least one stacking unit may have an equal size. This has the advantage that the symmetry properties for the current-compensating effect can be further improved and the choke can be manufactured simply and inexpensively. In particular, in a circular ring, the separation segments are spaced 360°/M apart, where M is the number of conductors in the multi-conductor system. For example, in a 3-wire system, the separation segments are arranged at angles of 0°, 120° and 240°, respectively, and in a 4-wire system at angles of 0°, 90°, 180° and 270°.

In a further advantageous embodiment according to the second aspect, the winding blocks each have only turns in the region of the respective corresponding separation segment. Thus, there are no windings of the winding blocks in the region of the gaps. The winding blocks thus lie in a defined position above the separation segments. This results in larger and clearly definable stray inductances.

In a further advantageous embodiment according to the second aspect, a non-magnetic filling material is arranged in at least part of the gaps. The filling material can also be slightly magnetic. As an example, the magnetic permeability of the filling material may be at most 1/10 of the magnetic permeability of the separation segments. As an example, the magnetic permeability of the filling material is between 1 and 20.

In a further advantageous embodiment according to the second aspect, the filling material is also arranged outside the gaps such that it forms separating bars separating the winding blocks. This has the advantage that the windings can be held in a defined manner above the separation segments. The separating bars simultaneously define clearances and creepage distances for safe insulation between the windings.

It is also possible that in an embodiment according to the first aspect, one or more separating bars for separating the winding blocks are arranged at the separation ring. The separating bars can be formed from the same material as the separation ring. The separating bars can be fixed to the separation ring, for example by bonding, or are formed as an integral part of the separation ring.

In a further advantageous embodiment according to the second aspect, an air gap is provided between the respective filling material and the adjacently arranged separation segment. Alternatively or additionally, a joining part comprising the filling material is arranged in the gaps and comprises one or more air slots. The air gap or the air slots are preferably designed in such a way that air or another fluid can flow through them easily and thus act as a cooling channel. In particular, the filling material may be arranged in the gaps in a non-positive-locking manner.

In a further advantageous embodiment according to the first and second aspects, the ring of the at least one stacking unit comprises a single closed ferromagnetic circular toroidal core element or a stack of a plurality of closed ferromagnetic circular toroidal core elements.

In a further advantageous embodiment according to the second aspect, at least one of the separation segments of the at least one stacking unit comprises a section or sector of a toroidal core, which comprises a single closed ferromagnetic circular toroidal core element or a stack of a plurality of closed ferromagnetic circular toroidal core elements. Advantageously for ease of fabrication, all of the separation segments of the core assembly are of the same configuration.

In a further advantageous embodiment according to the second aspect, at least one of the separation segments of the at least one stack assembly comprises a single I-core or a plurality of I-cores stacked parallel to the first surface or standing vertically on the first surface.

In another advantageous embodiment according to the first and second aspects, the core assembly comprises a plurality of the stacking units arranged along a longitudinal axis of the choke, and the windings of the winding blocks each enclose all rings and separation units of the stacking units together. Here, the separation units may be of different or the same design with respect to the rings and/or separation units.

BRIEF DESCRIPTION OF THE DRAWINGS

Exemplary embodiments of the invention are explained below with reference to the schematic drawings. However, no references to scale are shown. The invention is not limited here to the embodiments shown.

DETAILED DESCRIPTION OF ILLUSTRATIVE EMBODIMENTS

Figure 1A:
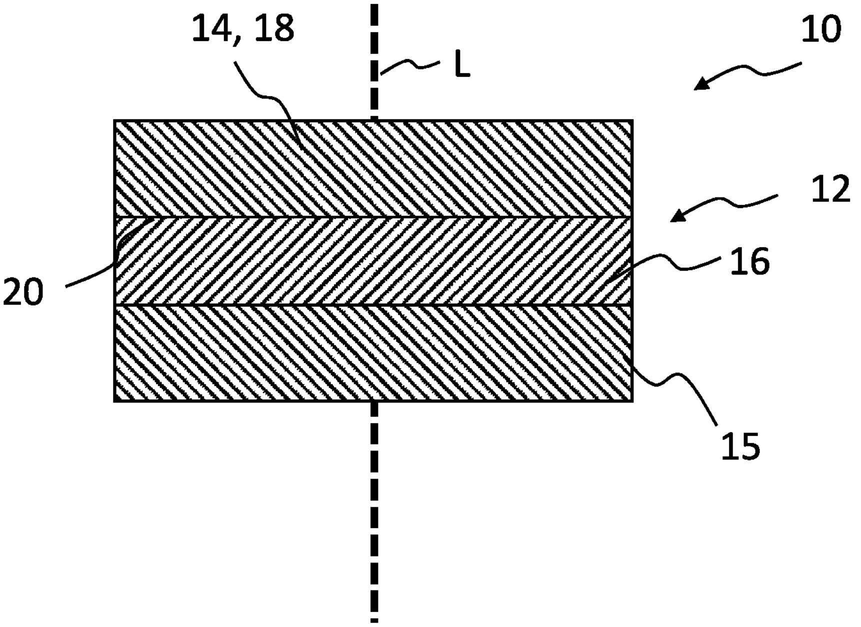
FIG. 1*a* shows a side view of an exemplary core assembly of a first embodiment of a choke for a multi-conductor system.

FIG. 1*a* shows a side view of an exemplary core assembly of a first embodiment of a choke for a multi-conductor system.

The core assembly 10 comprises at least one stacking unit 12. The at least one stacking unit 12 comprises a closed ring 14 and a separation unit 16. Optionally, the core assembly comprises a further ring 15.

The closed ring 14 and the further ring 15 each comprise a closed magnetic toroidal core or are each formed as a closed magnetic toroidal core.

Figure 2A:
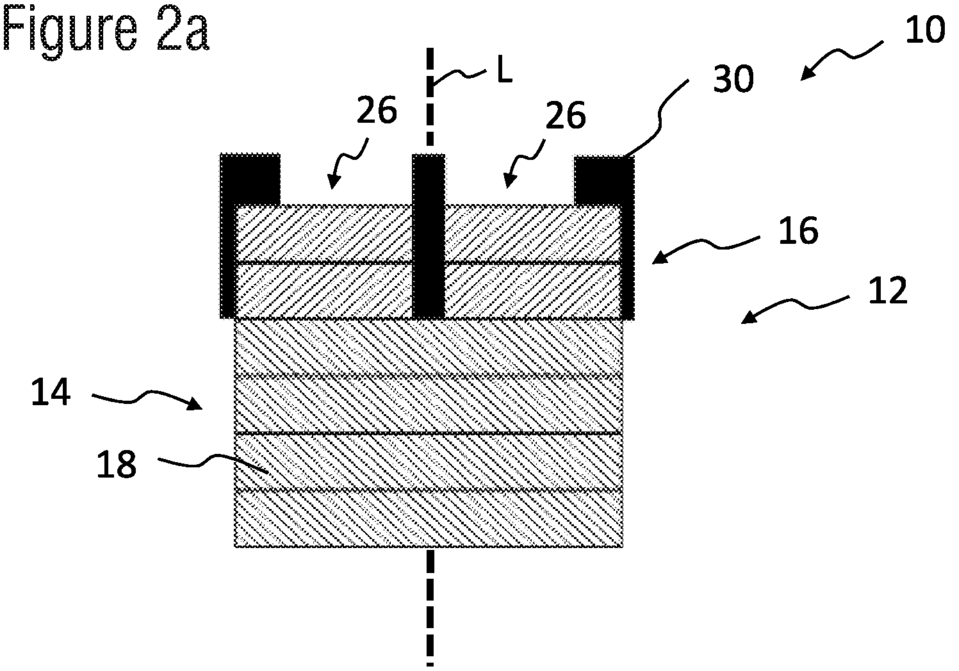
FIG. 2*a* shows a side view of an exemplary core assembly of a second embodiment of the choke for a multi-conductor system.

The closed ring 14 here comprises, for example, a single closed magnetic toroidal core element 18 or a stack of a plurality of closed magnetic toroidal core elements 18 (see also FIG. 2*a*).

A surface that the toroidal core elements 18 each enclose may be rectangular or elliptical, for example. In particular, the surface may be circular.

The toroidal core element or elements 18 are formed, for example, as toroids having a rectangular cross-section or a square cross-section. The toroidal core element or elements 18 have, for example, a height of approximately 10 mm to 15 mm, an inner diameter of 50 mm to 60 mm and an outer diameter of 80 mmm to 90 mm.

The toroidal core element or elements 18 comprise a ferromagnetic material or consist of a ferromagnetic material. For example, the toroidal core element or elements 18 comprise ferrite and/or iron powder and/or a ferrimagnetic ceramic material and/or Sendust.

In particular, the ring core elements 18 of a ring 14 may comprise different or the same materials and/or have different or the same magnetic permeabilities.

The ring 14 according to the first embodiment comprises, for example, four closed toroidal ferrite core elements.

The separation unit 16 of the at least one stacking unit 12 is arranged on a first surface 20 of the ring 14. The first surface 20 of the ring 14 preferably extends perpendicular to a longitudinal axis L of the ring 14. The separation unit 16 is, for example, bonded to the ring 14.

In the embodiment shown in FIG. 1*a*, the separation unit 16 exemplarily comprises a closed non-magnetic separation ring. The separation ring may comprise a single ring element or may comprise a plurality of stacked ring elements comprising a non-magnetic material or comprising a non-magnetic material. The separation ring can also be formed of a slightly magnetic material.

The height of the separation ring can be chosen such that the differential mode inductance is at least 1.5 times the differential mode inductance of a choke without separation unit but otherwise identically constructed. As an example, the differential mode inductance is at least twice as large. As an example, the height of the separation unit is several millimetres, e.g., at least 5 mm. As an example, the separation unit 16 has a similar height as the ring 14. As an example, the height of the separation unit 16 may be at least half the height of the ring 14 and at most twice the height of the ring 14.

Figure 1B:
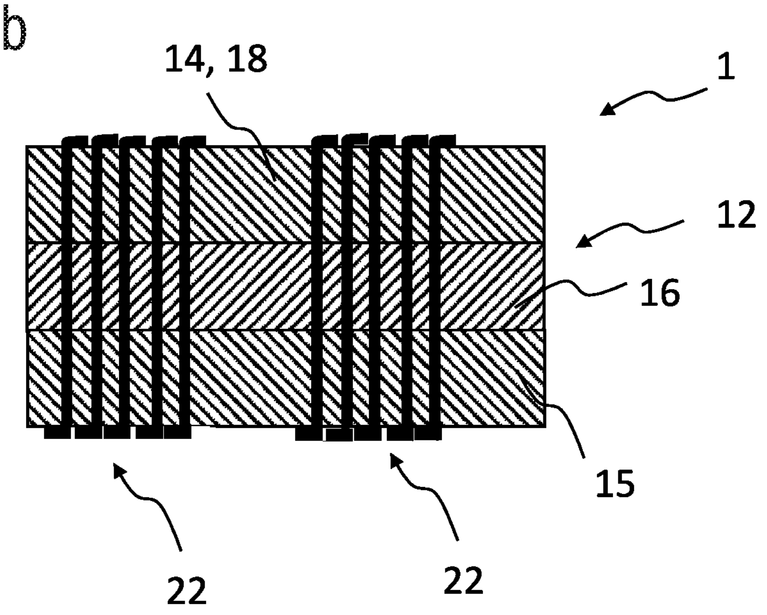
FIG. 1*b* shows a side view of the first embodiment of the choke.

FIG. 1*b* shows a side view of the first embodiment of the choke 1. The choke 1 has a winding block 22 with a predetermined number of turns for each conductor of the multi-conductor system.

The core assembly 10 comprises an inner opening 24, the inner opening 24 being enclosed by the ring 14 and by the separation unit 16 of the at least one stacking unit 12.

The windings of respective winding blocks 22 extend through the inner opening 24 of the core assembly 10 and enclose the ring 14 and the separation unit 16 of the at least one stacking unit 12.

The winding blocks 22 may comprise a single electrically conductive conductor or a plurality of electrical conductors connected in parallel.

The choke 1 according to the first embodiment is configured, for example, as a current-compensated choke. This is achieved, for example, among other things, by the winding blocks 22 each having an equal number of turns and an equal winding direction.

The winding blocks 22 are preferably applied to the core assembly 10 in a symmetrical manner, so that a desired high degree of compensation of common-mode interference signals is achieved when the arrangement has a symmetrical geometrical configuration and due to characteristics of the ring 14 with respect to stray inductances.

Preferably, the winding blocks 22 are arranged along a circumferential line of the ring 14 such that respective distances between immediately adjacent winding blocks 22 are equal within normal manufacturing tolerances.

Furthermore, other characteristics of the winding blocks 22, such as the distances between individual turns, and the like can be set up as symmetrically as possible for all winding blocks 22. Furthermore, the winding blocks each comprise, for example, an equal number of conductors, and the conductors of the respective winding blocks 22 comprise, for example, an identical electrically conductive material or consist of the same electrically conductive material.

The choke 1 of the first embodiment may comprise separating bars for separating the winding blocks 22. As an example, the separating bars may be fixed to the separation ring or may be an integral part of the separation ring. Depending on the position of the separation ring, the separating bars may protrude laterally, in an axial direction or both laterally and in an axial direction from the separating bar. The separating bars can be formed as the separating bars in FIGS. 2*a*, 3*a* and all other embodiments. All further characteristics of the separating bars disclosed for the other embodiments may be present in separating bars of the first embodiment.

Figure 1C:
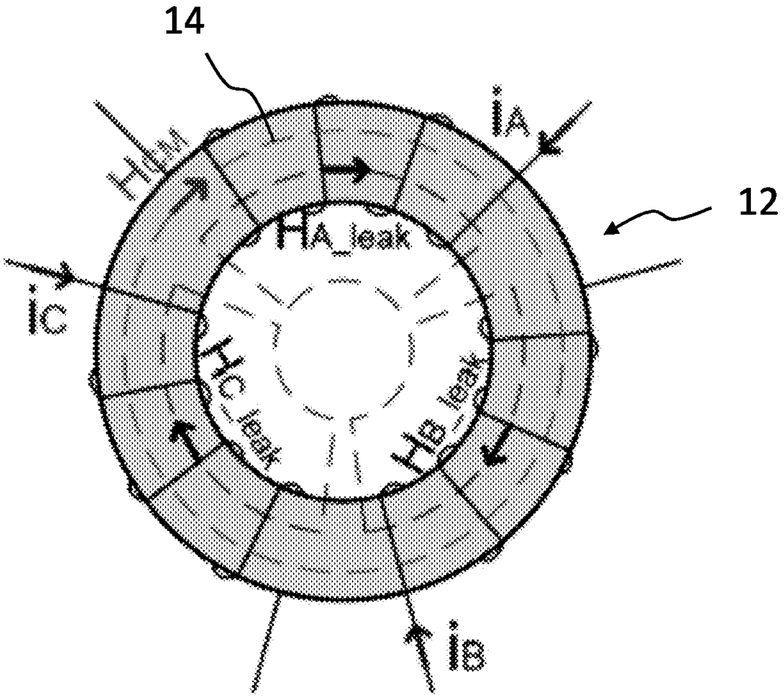
FIG. 1*c* shows a top view of the core assembly according to the first embodiment of the choke.

FIG. 1*c* shows a top view of the core assembly 10 according to the first embodiment of the choke 1. In particular, FIG. 1*c* shows the course of the magnetic field lines in the ring 14.

This example shows the choke 1 for a 3-conductor system or a 3-phase system.

For example, the choke 1 comprises three identical winding blocks 22 symmetrically arranged on the core assembly 10. The magnetic fields induced by the currents in the three-phase windings add up in the toroidal core. The following therefore applies $$Hcore^{*}1e = n^{*}(iA + iB + iC). \qquad (1)$$

Here, Hcore represents the magnetic field in the toroidal core that couples into all three winding blocks, le is the effective length of the magnetic path of the toroidal core, and n is the number of turns in each winding block 22. Due to the finite permeability of the magnetic core material, a small portion of the magnetic field generated by the conductor currents iA, iB, and iC is leaked by the toroidal core into the air, which is indicated by dashed lines in FIG. 1*c* and denoted by HLeak. The leakage flux of one winding is characterized by the fact that it is not interdinked with the other windings. The stray fields of current-compensated windings leaves the core essentially in the gaps between the windings.

Figure 1D:
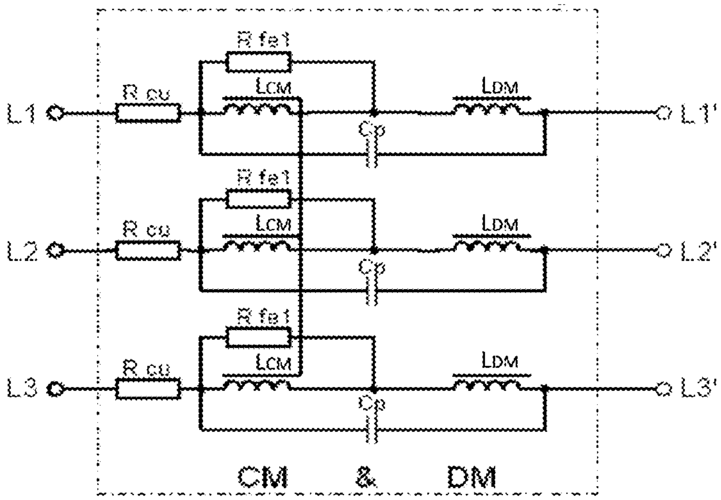
FIG. 1*d* shows a simplified electrical equivalent circuit diagram of the choke according to the first embodiment.

FIG. 1*d* shows a simplified electrical equivalent circuit diagram of the choke 1 according to the first embodiment.

In the equivalent circuit diagram, the resistors RCU take into account the ohmic losses of the winding blocks. The resistors RFE take into account the magnetic losses of the toroidal core and Cp the coupling capacitances within the winding blocks.

Advantageously, the separation unit 16 forms an air coil (μr=1) with each of the winding blocks 22, which acts as a differential-mode inductance. The differential-mode inductances LDM of the choke 1 thus comprise in each case, in addition to a stray inductance, and the inductances of the respective air coils.

For the choke 1 according to the first embodiment, this results in the following inductances (for typically LCM>>LDM):

$$LCM = n2^{*}AL(\text{inductance factor } AL = \mu r^{*}\mu o^{*}Ae/le)$$

$$LDM = Lair\ \text{coil} + Lstray$$

where Ae is the inner cross-section of the toroidal cores 14, 15. Lstray is the stray inductance. The inductance of the air coil Lair coil depends on an air coil shape, which can be round, oval or rectangular, for example.

FIG. 2*a* shows a side view of an exemplary core assembly 10 of a second embodiment of a choke 1 for a multi-conductor system.

The core assembly 10 comprises at least one stacking unit 12. The at least one stacking unit 12 comprises a closed ring 14, and a separation unit 16.

The closed ring 14 is formed, for example, as a closed magnetic toroidal core.

The ring 14 is formed, for example, as the ring 14 described in the first embodiment.

The separation unit 16 comprises a separation segment 26 for each conductor. The separation segments 26 are arranged on the first surface 20 of the ring 14 at pre-determined distances along the circumferential line of the ring 14, such that there is a gap 28 between each of the adjacent separation segments.

The separation segments 26 preferably comprise a ferromagnetic material or consist of a ferromagnetic material. For example, they comprise ferrite and/or iron powder and/or a ferrimagnetic ceramic material and/or Sendust.

Alternatively, it is possible that the separation segments 26 are non-magnetic and made of a material having a relative permeability of μr=1. It is also possible that the separation segments 26 are slightly magnetic. As an example, the separation segments 26 may be formed as plastic parts. The plastic parts may be non-elastic.

Figure 2B:
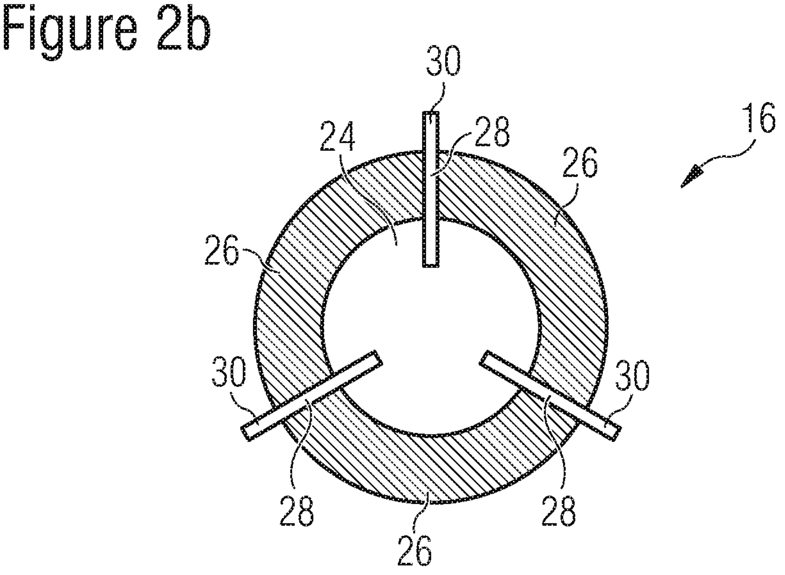
FIG. 2*b* shows a top view of the core assembly according to the second embodiment of the choke for a multi-conductor system.

FIG. 2*b* shows a top view of the core assembly 10 according to the second embodiment of the choke 1.

The separation segments 26 of the at least one stacking assembly 12 comprise, for example, a section or sector of a toroidal core, which comprises a single closed ferromagnetic circular toroidal core element or a stack of a plurality of closed ferromagnetic circular toroidal core elements. In particular, the same toroidal core elements that are used for the ring 14 can be used to manufacture the separation segments. Here, a size of the toroidal core elements can be chosen to be the same or different.

In the example shown, the separation segments 26 are all of the same design, but may also be of different design, in particular in terms of shape and/or material.

For example, a non-magnetic filling material is arranged in the gaps 28. The filling material can also be arranged outside the gaps in such a way that it forms separating bars which separate the winding blocks (see also FIG. 2*a*).

Figure 2C:
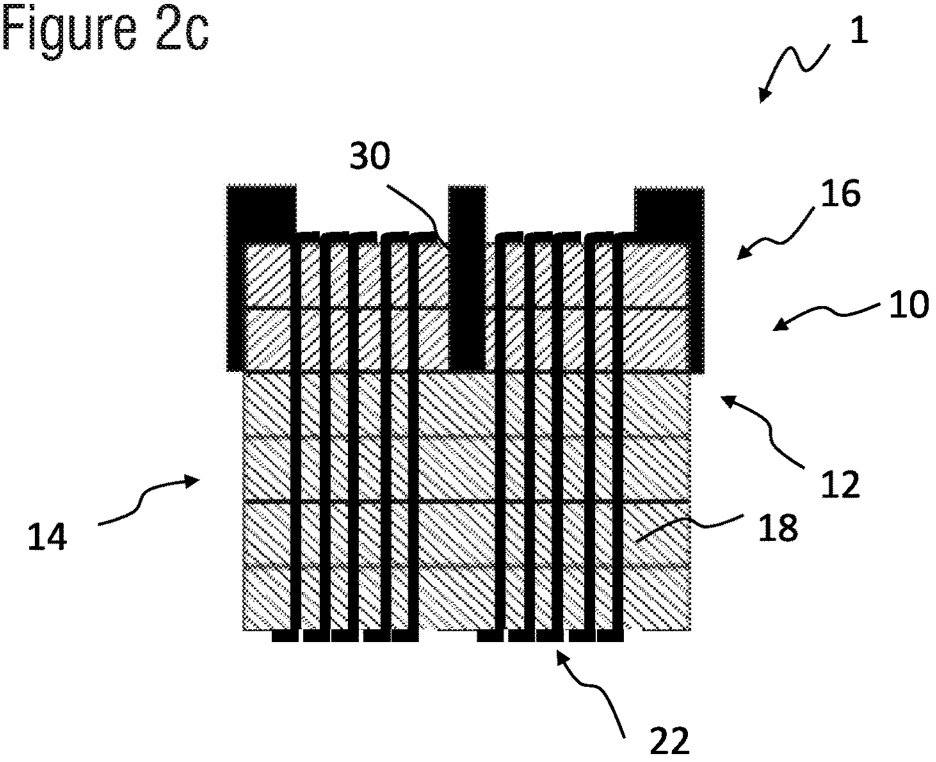
FIG. 2*c* shows a side view of the second embodiment of the choke according to the second embodiment.

FIG. 2*c* shows a side view of the second embodiment of the choke 1. The choke 1 comprises a winding block 22 with a pre-determined number of turns for each conductor of the multi-conductor system.

The separation segments 26 are arranged to correspond to the winding blocks 22, such that the turns of the respective winding blocks 22 extend through the inner opening 24 of the core assembly and enclose the ring 14 and the corresponding separation segment 26. In particular, the winding blocks 22 have windings only in the region of the respective corresponding separation segment 26. Regions in which the gaps 28 are located are preferably free of windings.

For example, the winding blocks 22 are formed like the winding blocks 22 described in the first embodiment.

Preferably, the winding blocks are designed to provide optimal current compensation for common-mode currents.

In particular, the separation segments 26 are arranged such that the respective distances between adjacent separation segments 26 are equal.

The separation segments 26 are, for example, bonded or taped to the ring 14 and/or are held in place by joining parts.

Figure 2D:
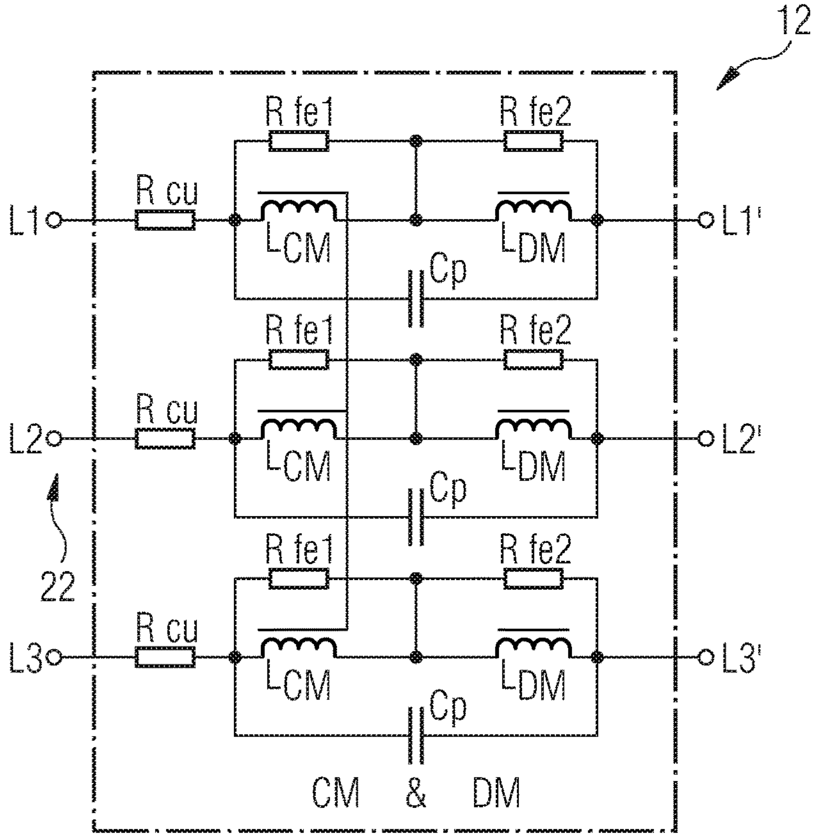
FIG. 2*d* shows a simplified electrical equivalent circuit diagram of the choke according to the second embodiment.

FIG. 2*d* shows a simplified electrical equivalent circuit diagram of the choke 1 according to the second embodiment. In contrast to the choke according to the first embodiment, in this equivalent circuit diagram the resistor Rfe2 represents the separation unit 16 with the separation segments 26 made of ferromagnetic material with $\mu$*Rfe2>>1. In relation to the choke 1, the resistor Rfe2 exhibits poorer saturation behaviour with simultaneously higher differential inductance than the choke 1 according to the first embodiment. Depending on application requirements, for example, a choke 1 according to the first embodiment or a choke according to the second embodiment can be selected.

In the equivalent circuit, the resistors RCU take into account the ohmic losses of the winding blocks. The resistors RFE1 and RFE2 take into account the magnetic losses of the toroidal core and the magnetic separation segments, respectively, and Cp takes into account the coupling capacitances within the winding blocks.

In a further embodiment of the core assembly 10 or choke 1 shown in FIGS. 2*a* to 2*c*, the ring 14 comprises, for example, a non-magnetic material and only the separation segments comprise a magnetic material. In this case, the choke 1 behaves as a differential-mode choke. The separation segments 26 may be bonded to the ring 14 and/or to each other. Alternatively, it is possible that all elements of the core assembly 10 are arranged a plastic trough or plastic cup.

Figure 3A:
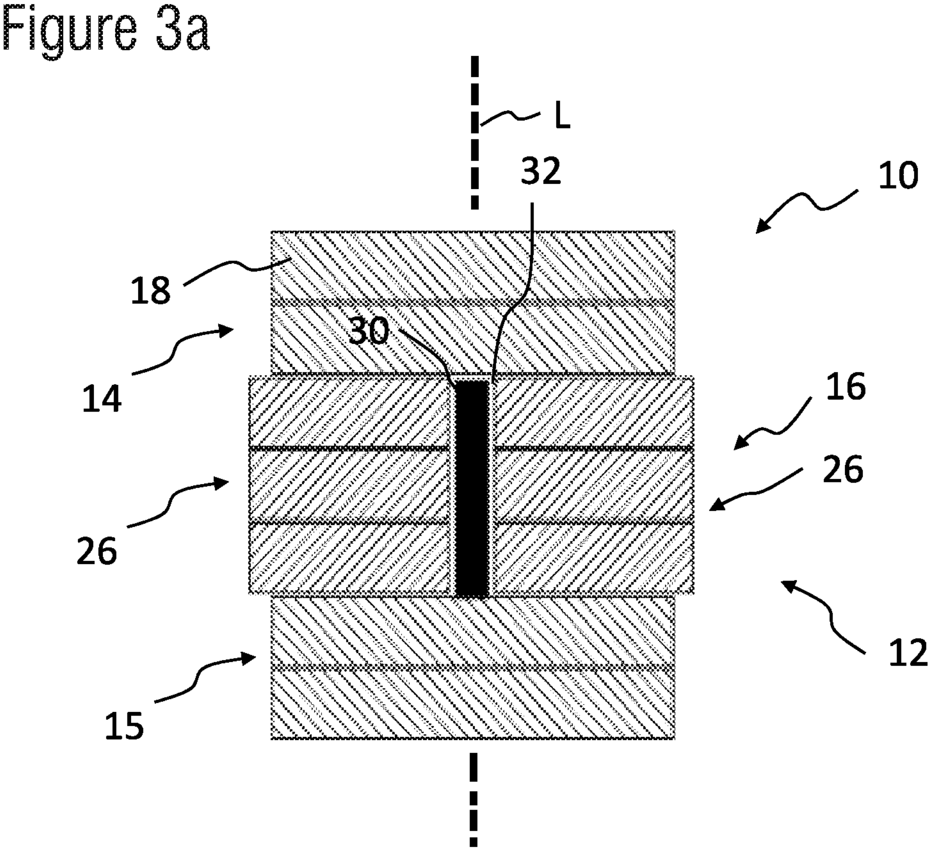
FIG. 3*a* shows a side view of an exemplary core assembly of a third embodiment of the choke for a multi-conductor system.
Figure 3B:
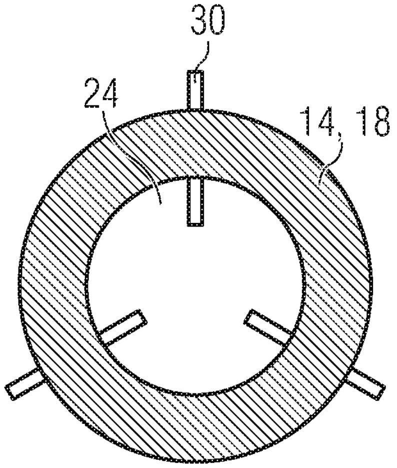
FIG. 3*b* shows a top view of the core assembly according to the third embodiment of the choke for a multi-conductor system.
Figure 3C:
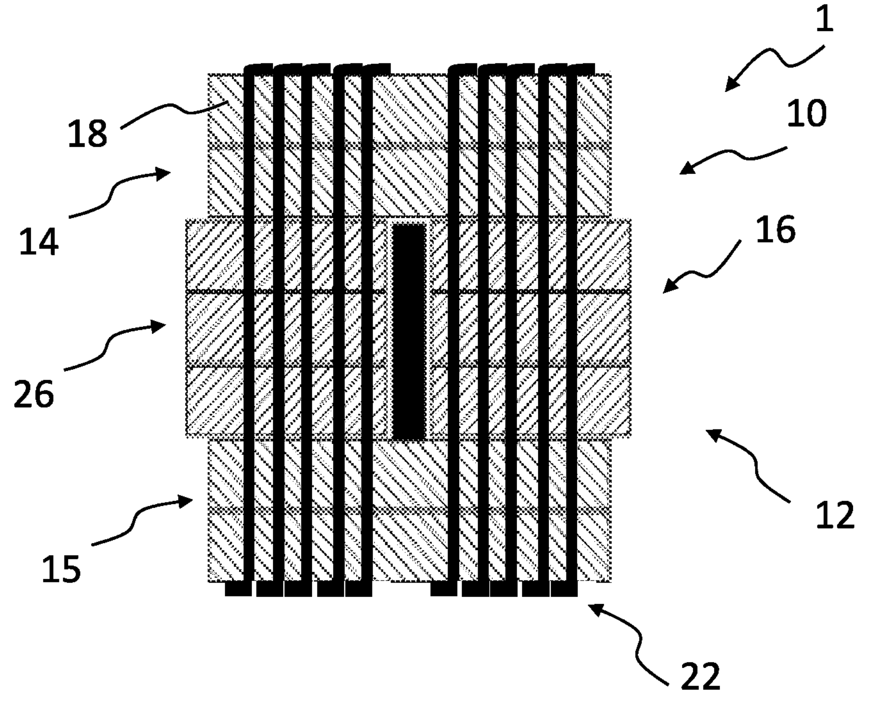
FIG. 3*c* shows a side view of the choke according to the third embodiment.

FIGS. 3*a* and 3*b* show a side view and a top view, respectively, of an exemplary core assembly 10 of a third embodiment of the choke 1 for a multi-conductor system. FIG. 3*c* shows a side view of the choke 1 according to the third embodiment.

The core assembly 10 comprises at least one stacking unit 12. The at least one stacking unit 12 comprises a closed ring 14 and a separation unit 16.

Further, the core assembly 10 comprises, for example, another ring 15 and the core assembly 10 is symmetrically configured along its longitudinal axis L.

The separation unit 16 of the at least one stacking unit 12 is configured, for example, as the separation unit 16 described in the second embodiment.

The ring 14 of the at least one stacking unit 12 is configured, for example, like the ring 14 described in the first embodiment.

The winding blocks 22 of the choke 1 (shown in FIG. 3*c*, not shown in FIGS. 3*a* and 3*b*) are formed and arranged, for example, like the winding blocks 22 described in the second embodiment.

A non-magnetic filling material 30 is arranged in the gaps 28, for example. The filling material 30 may also be arranged outside the gaps 28 in such a way that it forms separating bars separating the winding blocks 22.

Optionally, an air gap 32 may be located between the respective filling material 30 and the adjacently arranged separation segment 26. Alternatively, a joining part may be disposed in the gaps 28 comprising the filling material 30 and having one or more air slots. This allows air circulation and thus cooling of the core assembly.

For the choke 1 according to the third embodiment, the equivalent circuit diagram shown in FIG. 2*d* can also be used to describe the electrical and magnetic properties.

Figure 4:
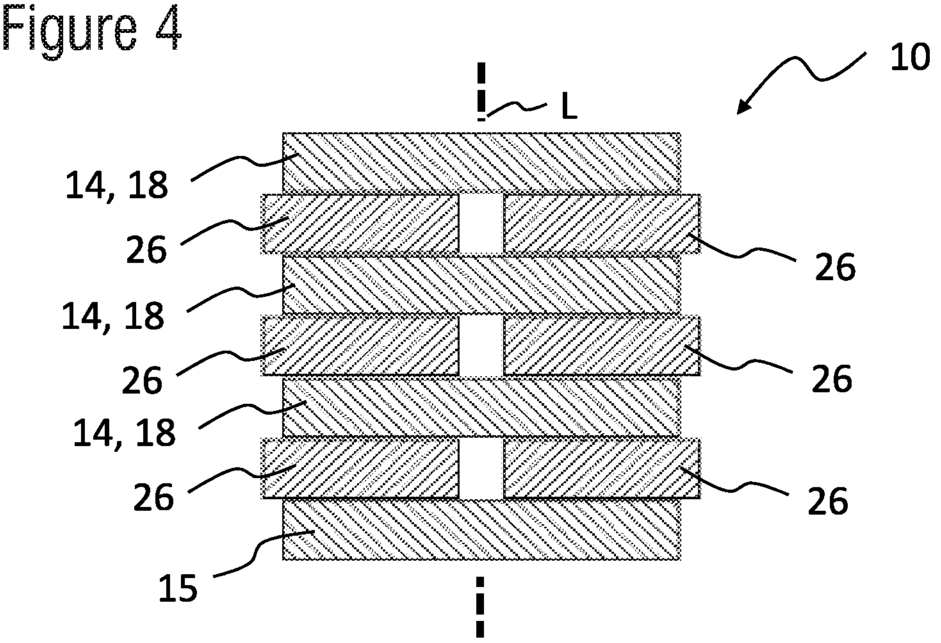
FIG. 4 shows a side view of a core assembly of a fourth embodiment of the choke for the multi-conductor system.

FIG. 4 shows a side view of a core assembly 10 of a fourth embodiment of the choke 1 for a multi-conductor system.

The core assembly 10 shown in FIG. 4 has a plurality of stacking units 12 arranged along the longitudinal axes L of the core assembly. For example, in the embodiment shown in FIG. 4, the stacking units 12 are each of the same design. The core assembly 10 shown in FIG. 4 has, for example, a further ring 15 which may be of the same or different design as the rings 14 of the stacking units.

For example, the separation units 16 of the stacking units 12 are formed like the separation unit 16 described in the second embodiment or like the separation unit 16 described in the first embodiment.

The rings 14 of the stacking units 12 are formed, for example, like the ring 14 described in the first embodiment.

The winding blocks of the choke (not shown in FIGS. 3*a* and 3*b*) are formed, for example, like the winding blocks described in the first or second embodiment.

Figure 5:
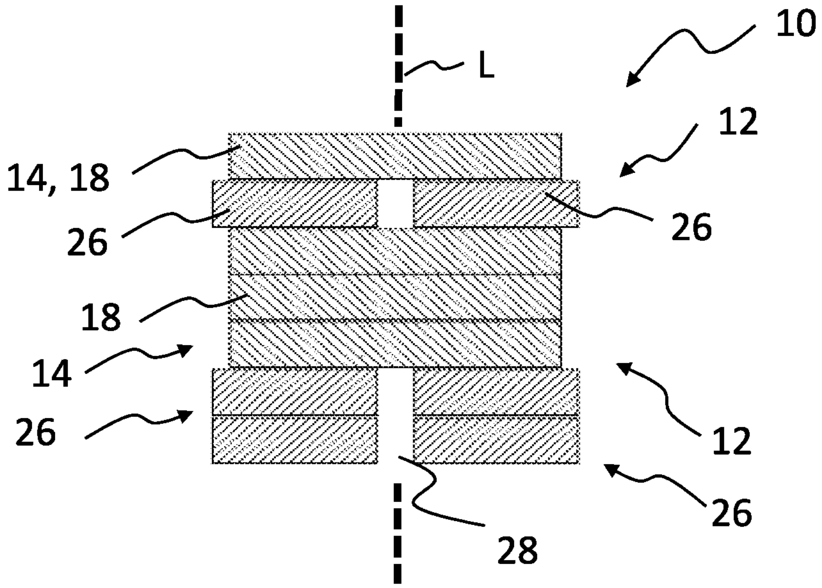
FIG. 5 shows a side view of a core assembly of a fifth embodiment of the choke for the multi-conductor system.

FIG. 5 shows a side view of a core assembly 10 of a fifth embodiment of the choke 1 for the multi-conductor system.

The core assembly 10 shown in FIG. 5 comprises a plurality of stacking units 12 arranged along the longitudinal axes L of the core assembly 10. In the embodiment shown in FIG. 5, the stacking units 12 are configured, for example, partially identically and partially differently.

Figure 6:
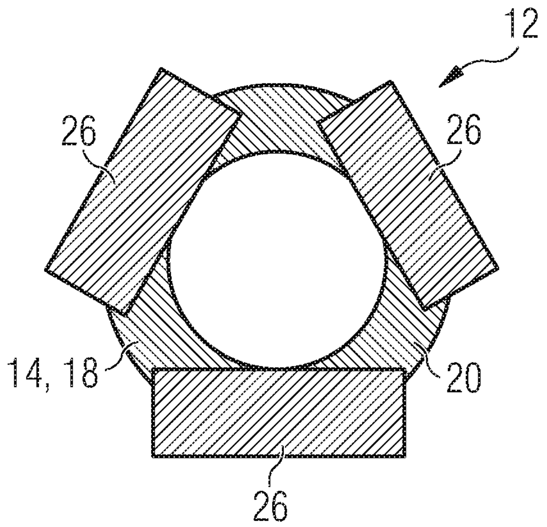
FIG. 6 shows a top view of a stacking unit of a sixth embodiment of the choke for a multi-conductor system.

FIG. 6 shows a top view of a stacking unit 12 of a sixth embodiment of the choke 1 for a multi-conductor system.

The stacking unit 12 shown in FIG. 6 comprises at least one separation segment 26 comprising a single I-core or a plurality of I-cores arranged parallel to the first surface 20 in a stacked manner. Preferably, however, all separation segments 26 of the separation unit 16 are of the same configuration.

Figure 7A:
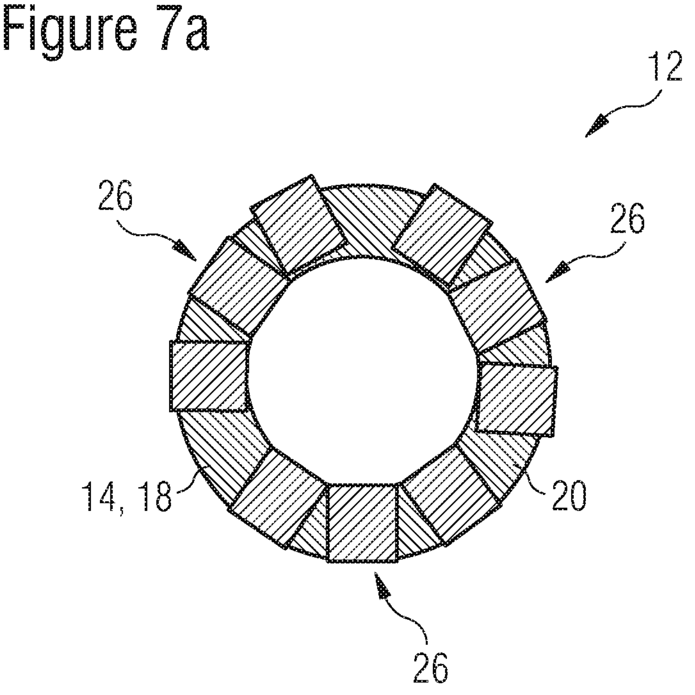
FIG. 7*a* shows a top view of a stacking unit of a seventh embodiment of the choke for a multi-conductor system.

FIG. 7*a* shows a top view of a stacking unit 12 of a seventh embodiment of the choke 1 for a multi-conductor system.

The stacking unit 12 shown in FIG. 7*a* comprises at least one separation segment 26 comprising a single I-core or a plurality of I-cores arranged perpendicularly on the first surface 20. Preferably, however, all separation segments 26 of the separation unit 16 are of the same design.

Figure 7B:
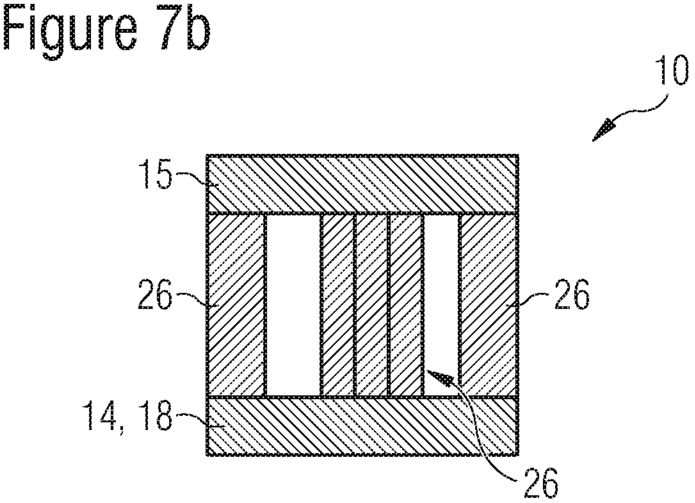
FIG. 7*b* shows a side view of the core assembly according to the seventh embodiment.

FIG. 7*b* shows a corresponding side view of the core assembly 10 according to the seventh embodiment. In an optional embodiment, the core assembly has a further ring 15, which is formed, for example, as a magnetic toroidal core.

In particular, the stacking units 12 according to the sixth and seventh embodiments can also be used as stacking units 12 for the chokes 1 according to the first to fifth embodiments.

Figure 8A:
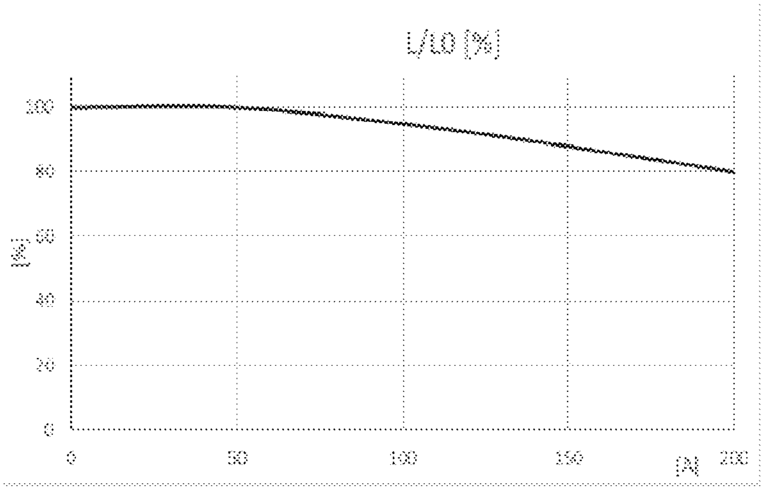
FIG. 8*a* shows a course of the common-mode inductance of the choke 1 according to the third embodiment depending on an operating current.
Figure 8B:
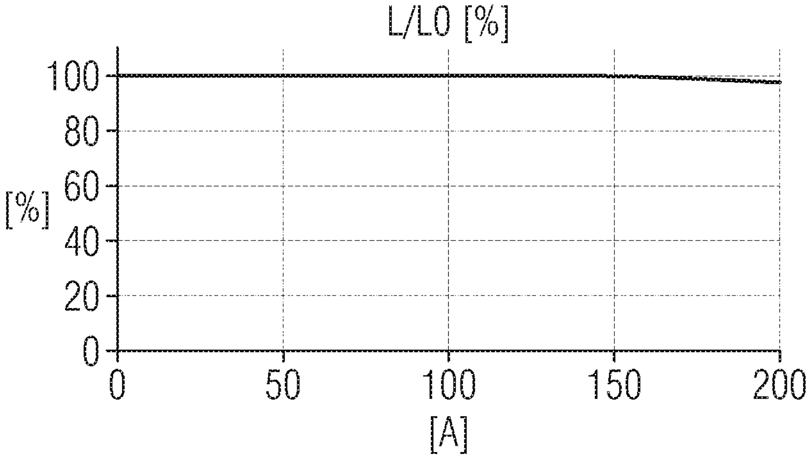
FIG. 8*b* shows a curve of the differential-mode inductance of the choke according to the third embodiment as a function of the operating current.

FIGS. 8*a* and 8*b* show a course of the common-mode inductance and the differential-mode inductance, respectively, of a choke 1 according to the third embodiment as a function of the current.

The nominal common-mode inductance of the choke is 1.1 mH. The current has a frequency of 10 kHz. The common-mode inductance of the choke is reduced to about 80% of the nominal common-mode inductance when the current is increased from 0 A to 200 A.

The choke simultaneously provides a differential-mode inductance of 13 μH. The differential-mode inductance remains almost constant over the entire measuring range from 0 A to 180 A.

Figure 9:
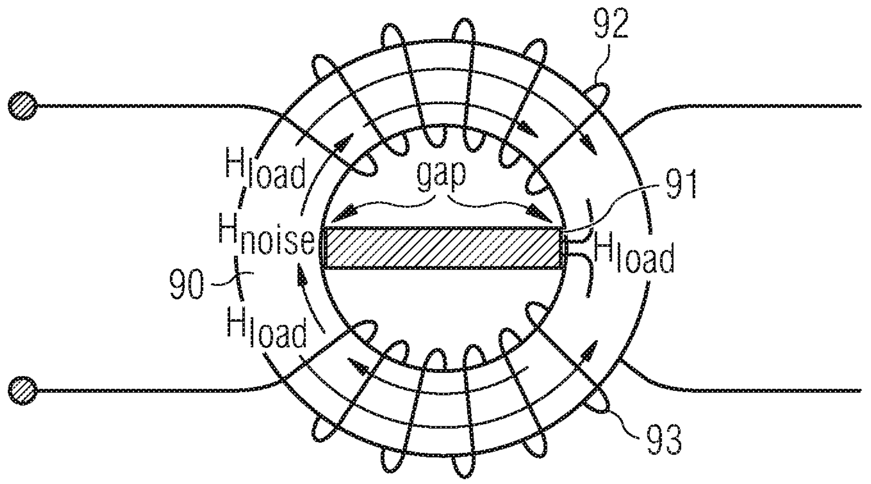
FIG. 9 shows a combined common-mode-differential-mode choke according to the prior art.

In the prior art current compensated choke as shown in FIG. 9, the possibility of increasing the stray inductance is very limited due to the limited design space and the differential-mode inductance is on average 1% of the common-mode inductance. If the winding space is limited and parallel windings are used, the value of the differential inductance is about 0.5% of the common-mode inductance.

In the case of the choke, an increase in the differential-mode inductance by a factor of 2.4 could be achieved for a choke 1 according to the second embodiment and the third embodiment. Also with chokes according to the first and all further embodiments, a considerable increase of the differential-mode inductance may be achieved. As an example, the differential-mode inductance may be 1.5 times or 2 times the differential-mode inductance of a choke without separation unit but otherwise identically constructed. This can depend, in particular, from the height of the respective separation unit. As an example, in all embodiments, a height of the separation unit may be at least 5 mm.

The invention described herein is not limited by the description based on the embodiments. Rather, the invention encompasses any new feature as well as any combination of features, which in particular includes any combination of features in the claims, even if that feature or combination itself is not explicitly stated in the claims or embodiments.

What is claimed is:

1. A choke for a multi-conductor system comprising:

a core assembly; and a plurality of winding blocks, each winding block having a number of turns for each conductor of the multi-conductor system, wherein the core assembly comprises at least one stacking unit comprising a closed ring and a separation unit, wherein the separation unit comprises a separation segment for each conductor, the separation segments being arranged on a first surface of the closed ring in a pre-determined spaced-apart relationship along a circumferential line of the closed ring such that a gap is present between each of adjacent separation segments, wherein each separation segment comprises a ferromagnetic material, wherein the core assembly has an inner opening enclosed by the closed ring and enclosed at least partially by the separation unit, wherein each winding block of the winding blocks extends through the inner opening and surrounds the closed ring and a corresponding separation segment, and wherein each winding of the winding blocks encloses all closed rings and all separation units of the stacking unit.

2. The choke according to claim 1, wherein each winding block has an identical number of turns and/or an identical winding direction.

3. The choke according to claim 1, wherein the winding blocks are arranged along the circumferential line of the closed ring such that respective distances between immediately adjacent winding blocks are equal.

4. The choke according to claim 1, wherein respective distances between adjacent separation segments are equal.

5. The choke according to claim 1, wherein each winding block has only turns in a region of the respective corresponding separation segment.

6. The choke according to claim 1, further comprising a non-magnetic filling material arranged at least in a part of the gaps.

7. The choke according to claim 6, wherein the filling material is also arranged outside the gaps such that it forms separating bars which separate the winding blocks.

8. The choke according to claim 6, wherein an air gap is located between the respective filling material and the adjacently arranged separation segment, and/or wherein a joining part, which comprises the filling material and is arranged in the gaps, comprises one or more air slots.

9. The choke according to claim 1, wherein the closed ring of the at least one stacking unit comprises a single closed ferromagnetic circular toroidal core element or a stack of a plurality of closed ferromagnetic circular toroidal core elements.

10. The choke according to claim 1, wherein at least one of the separation segments of the at least one stacking unit comprises a section or sector of a ring comprising a single closed ferromagnetic circular toroidal core element or a stack of a plurality of closed ferromagnetic circular toroidal core elements.

11. The choke according to claim 1, wherein at least one of the separation segments of the at least one stacking unit comprises a single I-core or a plurality of I-cores stacked parallel to the first surface or standing vertically on the first surface.

12. The choke according to claim 1, wherein the core assembly comprises a plurality of the stacking units arranged along a longitudinal axis of the choke and each of the windings of the winding blocks encloses all rings and the separation units of the stacking units together.

13. The choke according to claim 1, further comprising a non-magnetic filling material arranged at least in a part of the gaps.

14. The choke according to claim 13, wherein the filling material is also arranged outside the gaps such that it forms separating bars which separate the winding blocks, or wherein an air gap is located between the respective filling material and the adjacently arranged separation segment, and/or wherein a joining part, which comprises the filling material and is arranged in the gaps, comprises one or more air slots.

15. A choke for a multi-conductor system comprising:

a core assembly; and a plurality of winding blocks, each winding block having a number of turns for each conductor of the multi-conductor system, wherein the core assembly comprises at least one stacking unit comprising a closed ring and a separation unit, wherein the separation unit comprises a separation segment for each conductor, the separation segments being arranged on a first surface of the closed ring in a pre-determined spaced-apart relationship along a circumferential line of the closed ring such that a gap is present between each of adjacent separation segments, wherein the closed ring is formed as a closed magnetic toroidal core, wherein the core assembly has an inner opening enclosed by the closed ring and enclosed at least partially by the separation unit, wherein each winding block of the winding blocks extends through the inner opening and surrounds the closed ring and a corresponding separation segment, and wherein each winding of the winding blocks encloses all closed rings and all separation units of the stacking unit.

16. The choke according to claim 15, wherein each winding block has an identical number of turns and/or an identical winding direction.

17. The choke according to claim 15, wherein the winding blocks are arranged along the circumferential line of the closed ring such that respective distances between immediately adjacent winding blocks are equal.

18. The choke according to claim 15, wherein respective distances between adjacent separation segments are equal.

19. The choke according to claim 15, wherein each winding block has only turns in a region of the respective corresponding separation segment.

20. The choke according to claim 15, wherein the closed ring of the at least one stacking unit comprises a single closed ferromagnetic circular toroidal core element or a stack of a plurality of closed ferromagnetic circular toroidal core elements.

21. The choke according to claim 15, wherein at least one of the separation segments of the at least one stacking unit comprises a section or sector of a ring comprising a single closed ferromagnetic circular toroidal core element or a stack of a plurality of closed ferromagnetic circular toroidal core elements.

22. A choke for a multi-conductor system comprising:

a core assembly; and a plurality of winding blocks, each winding block having a number of turns for each conductor of the multi-conductor system, wherein the core assembly comprises at least one stacking unit comprising a closed ring and a separation unit, wherein the separation unit comprises a separation segment for each conductor, the separation segments being arranged on a first surface of the closed ring in a pre-determined spaced-apart relationship along a circumferential line of the closed ring such that a gap is present between each of adjacent separation segments, wherein each separation segment comprises a ferromagnetic material and the closed ring is formed as a closed magnetic toroidal core, wherein the core assembly has an inner opening enclosed by the closed ring and enclosed at least partially by the separation unit, wherein each winding block of the winding blocks extends through the inner opening and surrounds the closed ring and a corresponding separation segment, and wherein each winding of the winding blocks encloses all closed rings and all separation units of the stacking unit.

* * * * *